United States Patent
Ikebe

(10) Patent No.: US 9,459,712 B2
(45) Date of Patent: *Oct. 4, 2016

(54) DETECTION DEVICE, ELECTRONIC APPARATUS, AND ROBOT

(75) Inventor: Tomo Ikebe, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 928 days.

This patent is subject to a terminal disclaimer.

(21) Appl. No.: 13/188,996

(22) Filed: Jul. 22, 2011

(65) Prior Publication Data

US 2012/0022799 A1    Jan. 26, 2012

(30) Foreign Application Priority Data

Jul. 26, 2010 (JP) ................................. 2010-166791
Jun. 24, 2011 (JP) ................................. 2011-140619

(51) Int. Cl.
*G01L 1/04* (2006.01)
*G06F 3/0354* (2013.01)
*B25J 13/08* (2006.01)

(52) U.S. Cl.
CPC .......... *G06F 3/03547* (2013.01); *B25J 13/082* (2013.01)

(58) Field of Classification Search
CPC ....... G01L 1/04; G01L 1/205; G06F 3/0414; G06F 3/0412; G06F 3/044; G06F 3/03547; G06F 19/00
USPC ....... 702/41, 57, 64–65, 127, 138–139, 150, 702/152, 155, 158, 189, 196; 73/1.79, 1.81, 73/862.041–862.043, 862.046, 862.621, 73/862.625–862.626, 862.629, 862.68, 73/862.041–862.043; 178/18.01, 18.06, 178/19.03–19.04; 345/156, 173
See application file for complete search history.

(56) References Cited

U.S. PATENT DOCUMENTS

| | | |
|---|---|---|
| 4,323,740 A | 4/1982 | Balash |
| 4,953,410 A | 9/1990 | Tabota |
| 6,710,267 B2 | 3/2004 | Natsuyama et al. |

(Continued)

FOREIGN PATENT DOCUMENTS

| | | |
|---|---|---|
| JP | A-60-135834 | 7/1985 |
| JP | A-7-128163 | 5/1995 |

(Continued)

OTHER PUBLICATIONS

David J. Hall, Robotic Sensing Devices, Mar. 1984, Department of Electrical Engineering, The Robotics Institute, Carnegie-Mellon University, Pittsburgh, Pennsylvania, 94 pp.*

(Continued)

*Primary Examiner* — Toan Le
(74) *Attorney, Agent, or Firm* — Oliff PLC

(57) ABSTRACT

A detection device includes a first substrate that has a plurality of pressure sensors disposed around a reference point, and a second substrate on which disposed an elastic projection whose center is positioned in a position overlapping with the reference point and that elastically deforms due to the external force in a state in which the tip portion of the elastic projection makes contact with the first substrate. When an external force has been applied, the direction and intensity of the applied external force is found by carrying out a predetermined calculation using pressure values detected by the pressure sensors.

13 Claims, 13 Drawing Sheets

(56) References Cited

U.S. PATENT DOCUMENTS

| | | | |
|---|---|---|---|
| 7,057,875 B2 | 6/2006 | Fujiyama et al. | |
| 7,129,584 B2 | 10/2006 | Lee | |
| 8,707,802 B2* | 4/2014 | Amano et al. | 73/862.046 |
| 9,074,955 B2* | 7/2015 | Ikebe | G01L 5/16 |
| 9,121,782 B2* | 9/2015 | Amano | B25J 13/083 |
| 2004/0160235 A1* | 8/2004 | Okada | G01L 1/142 |
| | | | 324/681 |
| 2005/0190152 A1* | 9/2005 | Vaganov | 345/157 |
| 2007/0040107 A1 | 2/2007 | Mizota et al. | |
| 2010/0134428 A1* | 6/2010 | Oh | 345/173 |
| 2010/0139418 A1 | 6/2010 | Loeb et al. | |
| 2012/0072131 A1* | 3/2012 | Ikebe | 702/41 |
| 2012/0096952 A1* | 4/2012 | Amano et al. | 73/862.046 |
| 2012/0144932 A1 | 6/2012 | Ikebe et al. | |
| 2012/0198945 A1 | 8/2012 | Yoneyama | |
| 2013/0021544 A1 | 1/2013 | Fukuyama et al. | |
| 2014/0144253 A1* | 5/2014 | Amano et al. | 73/862.636 |

FOREIGN PATENT DOCUMENTS

| | | |
|---|---|---|
| JP | A-2007-187502 | 7/2007 |
| JP | A-2007-518966 | 7/2007 |
| JP | A-2008-164557 | 7/2008 |
| JP | B2-4364146 | 11/2009 |
| TW | 200844416 A | 11/2008 |
| WO | WO 2005/029028 A1 | 3/2005 |

OTHER PUBLICATIONS

Jul. 17, 2013 Office Action issued in U.S. Appl. No. 13/240,244.
U.S. Appl. No. 13/233,500 in the name of Ikebe filed Sep. 15, 2011.
U.S. Appl. No. 13/240,244 in the name of Amano et al. filed Sep. 22, 2011.
Jan. 12, 2015 Office Action issued in U.S. Appl. No. 14/171,297.
Feb. 5, 2015 Office Action issued in U.S. Appl. No. 13/233,500.
Min et al., "A Brief Introduction of Development Status of Flexible Array Type Pressure Sensors," Dec. 2009, Spacecraft Environment Engineering, pp. 112-115, vol. 26.

* cited by examiner

DETECTION DEVICE, ELECTRONIC APPARATUS, AND ROBOT

This application claims priority to JP 2010-166791 filed in Japan on Jul. 26, 2010 and to JP 2011-140619 filed in Japan on Jun. 24, 2011, the entire disclosures of which are hereby incorporated in their entirety.

BACKGROUND

1. Technical Field

The present invention relates to detection devices, electronic apparatuses, and robots.

2. Related Art

The detection devices disclosed in JP-A-60-135834 and JP-A-7-128163 are known as detection devices that detect an external force. The application of such detection devices in tactile sensors for touch panels, robots, and so on is under consideration.

The detection device disclosed in JP-A-60-135834 is configured using a pressure receiving sheet on the rear surface of which cone-shaped protrusions are disposed in an essentially uniform manner, and pressure distributions are detected from the amounts by which the protrusions deform. However, the detection device disclosed in JP-A-60-135834 cannot measure forces acting in directions within the plane due to pressure applied to the measurement surface (that is, cannot measure sliding forces).

Meanwhile, the detection device disclosed in JP-A-7-128163 is configured with a plurality of column-shaped protrusions disposed in a matrix on the front surface of a pressure receiving sheet, with conical protrusions provided in the rear surface in areas that equally divide the peripheral areas of the front surface protrusions. Although the detection device disclosed in JP-A-7-128163 does enable an external pressure to be detected as a three-dimensional force vector, the detection limit for external pressure is defined by the degree to which the protrusions deform.

As described above, neither the detection device according to JP-A-60-135834 nor the detection device according to JP-A-7-128163 is capable of detecting the direction and intensity of an external pressure with high precision.

SUMMARY

It is an advantage of some aspects of the invention to provide a detection device, an electronic apparatus, and a robot capable of detecting the direction and intensity of an external pressure with high precision.

A detection device according to an aspect of the invention is a detection device that detects the direction and intensity of an external pressure applied to a reference point, and includes: a first substrate that includes a plurality of pressure sensors disposed around the reference point; and a second substrate on which disposed an elastic projection whose center of gravity (hereinafter referred to as "center") is positioned in a position overlapping with the reference point and that elastically deforms due to the external pressure in a state in which the tip portion of the elastic projection makes contact with the plurality of pressure sensors.

According to this detection device, the elastic projection can deform in the sliding direction (a direction parallel to the surface of the pressure sensors) while making contact with the first substrate (the plurality of pressure sensors), and thus the precision with which the direction and intensity of the external pressure is detected can be increased compared to the detection devices disclosed in JP-A-60-135834 and JP-A-7-128163. When an external pressure is applied to the surface of the second substrate, the elastic projection is compressed and deforms with its tip portion making contact with the plurality of pressure sensors. Here, in the case where there is a sliding force component in a predetermined direction along the surface, the elastic projection deforms in an unbalanced manner. In other words, the center of the elastic projection shifts from the reference point and moves in a predetermined direction (the sliding direction). Upon doing so, the ratio of pressure sensors that overlap with areas in which the center of the elastic projection has moved becomes relatively greater. In other words, different pressure values are detected by the respective pressure sensors. Specifically, a relatively large pressure value is detected by pressure sensors in positions that overlap with the center of the elastic projection, whereas a relatively small pressure value is detected by pressure sensors in positions that do not overlap with the center of the elastic projection. Accordingly, a calculation device can calculate the difference between the pressure values detected by the respective pressure sensors and find the direction and intensity of the external pressure based on that difference. It is therefore possible to provide a detection device that is capable of detecting the direction and intensity of an external pressure with high precision.

It is preferable that the aforementioned detection device further include a calculation device that calculates differences between pressure values detected by pressure sensors combined at random from among pressure values detected by the plurality of pressure sensors when the elastic projection elastically deforms due to the external pressure, and calculates the direction in which the external pressure is applied and the intensity of the external pressure based on the differences.

In the aforementioned detection device, it is preferable that the plurality of pressure sensors be disposed symmetrically, with the reference point serving as the point of symmetry.

According to this detection device, the distances between the reference point and each of the pressure sensors are the same, and thus the relationships between the amount of deformation of the elastic projection and the pressure values detected by the respective pressure sensors are the same. For example, in the case where the plurality of pressure sensors are disposed at different distances from a reference point, the pressure values detected by the respective pressure sensors will differ from each other even if the amount of deformation of the elastic projection is the same. Accordingly, when calculating the difference between detected values, a correction coefficient based on the disposal locations of the pressure sensors is necessary. However, according to this configuration, the relationships between the amount of deformation of the elastic projection and the pressure values detected by the respective pressure sensors are the same, and thus the stated correction coefficient is unnecessary. Accordingly, it is easier to calculate the direction and intensity of the external pressure from the pressure values detected by the pressure sensors, which makes it possible to detect the external pressure in an efficient manner.

In the aforementioned detection device, it is preferable that the plurality of pressure sensors be disposed in matrix form in two directions that are orthogonal to each other.

According to this detection device, it is easy to calculate the direction and intensity of the external pressure based on the differences between the pressure values of pressure sensors combined at random, from among the pressure values of the pressure sensors.

In the aforementioned detection device, it is preferable that the plurality of pressure sensors be disposed in two directions that are orthogonal to each other, with at least four columns and four rows.

According to this detection device, a greater number of pressure sensors are disposed. For this reason, the direction and intensity of the external pressure can be found by calculating the accumulation of the detection results of the pressure sensors based on the pressure values detected by the high number of pressure sensors. Accordingly, it is possible to detect the direction and intensity of the external pressure with high precision.

In the aforementioned detection device, it is preferable that the plurality of elastic projections be disposed on the second substrate, and the plurality of elastic projections be disposed so as to be distanced from each other.

According to this detection device, when the elastic projections elastically deform, a certain amount of deformation in the direction parallel to the surface of a second main substrate unit can be permitted. For example, it is possible to suppress the influence of the deformation of one of the elastic projections when another elastic projection has deformed. Accordingly, an external pressure can be transmitted to the pressure sensors more precisely, compared to a case in which the plurality of elastic projections are disposed so as to make contact with each other. Accordingly, it is possible to detect the direction and intensity of the external pressure with high precision.

In the aforementioned detection device, it is preferable that a reinforcing member that is more resilient than the second substrate be disposed on the opposite side of the second substrate to the side on which the elastic projections are disposed.

According to this detection device, for example, in the case where the external pressure acts in a region between two adjacent elastic projections, it is possible to suppress the two adjacent elastic projections from being compressed and deforming in directions opposite to each other, as compared to the case where the reinforcing member is not provided. In other words, it is possible to suppress mistaken detections in which the direction opposite to the direction of the external pressure is detected. Accordingly, it is possible to detect the direction and intensity of the external pressure with high precision.

An electronic apparatus according to another aspect of the invention includes the detection device described above.

According to such an electronic apparatus, the aforementioned detection device is provided, and it is thus possible to provide an electronic apparatus capable of detecting the direction and intensity of an external pressure with high precision.

A robot according to another aspect of the invention includes the detection device described above.

According to such a robot, the aforementioned detection device is provided, and it is thus possible to provide a robot capable of detecting the direction and intensity of an external pressure with high precision.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
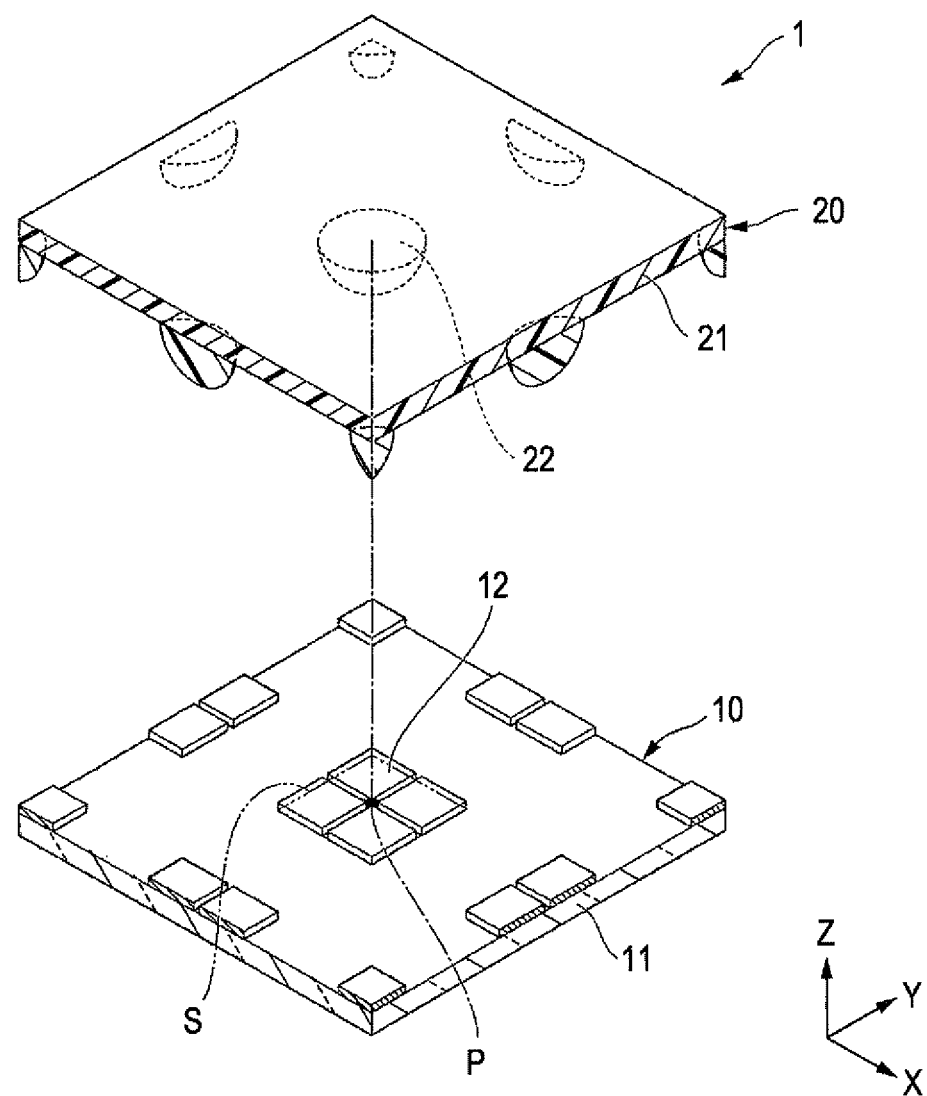
FIG. 1 is an exploded perspective view illustrating the overall configuration of a detection device according to a first embodiment of the invention.

Hereinafter, embodiments of the invention will be described with reference to the drawings. The embodiments illustrate only several aspects of the invention, and are not intended to limit the invention in any way; many variations can be made on the invention without departing from the scope of the technical spirit of the invention. Furthermore, to facilitate understanding of the various configurations, the scale, numbers, and so on of the various structures depicted in the drawings differ from those of the actual structures.

In the following descriptions, it is assumed that the XYZ orthogonal coordinate system indicated in FIG. 1 is employed, and the various members will be described with reference to this XYZ orthogonal coordinate system. In the XYZ orthogonal coordinate system, the X axis and Y axis are set to the directions that are parallel to a first substrate 10, whereas the Z axis is set to the direction that is orthogonal to the first substrate 10.

First Embodiment

FIG. 1 is an exploded perspective view illustrating the overall configuration of a detection device 1 according to a first embodiment of the invention. In FIG. 1, reference numeral P indicates a reference point, whereas reference numeral S indicates a unit detection region on which a plurality of pressure sensors 12 disposed in correspondence to a single elastic projection 22 carry out detection.

The detection device 1 is a pressure sensor-type touchpad that detects the direction and intensity of an external pressure applied to the reference point, and is used as, for example, a pointing device for an electronic apparatus such as a laptop computer or the like, in place of a mouse. Note that "reference point" refers to a point in which the center of the elastic projection is located in the case where a sliding force is not acting. Furthermore, the type of the pressure sensor is not especially limited, and, for example, an electrostatic capacitance-type sensor, a photosensor, or the like can be used as well.

As shown in FIG. 1, the detection device 1 includes the first substrate 10 that has a plurality of pressure sensors 12 disposed around the reference point P, and a second substrate 20 that has the elastic projection 22 which is disposed on the surface of the second substrate 20. The elastic projection 22 which is disposed with its center in a position that overlaps with the position of the reference point P and which elastically deforms due to the external pressure in a state in which the tip portion of the elastic projection makes contact with the plurality of pressure sensors 12 disposed on the surface of the first substrate 10.

The detection device 1 includes a calculation device (not shown) that calculates the difference between pressure values detected by pressure sensors 12 combined at random from among the pressure values detected by the plurality of pressure sensors 12 when the elastic projection 22 elastically deforms due to an external pressure, and calculates the direction and intensity of the external pressure based on that difference.

The first substrate 10 is configured so as to include a rectangular plate-shaped first main substrate unit 11 configured of a material such as glass, quartz, or plastic and the plurality of pressure sensors 12 disposed on the first main substrate unit 11. The intensity of the first main substrate unit 11 (when viewed from above) is, for example, approximately 56 mm in the depth direction and 56 mm in the width direction.

The plurality of pressure sensors 12 are disposed symmetrically using the reference point P as the point of symmetry. For example, the plurality of pressure sensors 12 are disposed in matrix form in two directions that are orthogonal to each other (the X direction and the Y direction). Accordingly, the distances between the reference point P and each of the pressure sensors 12 are the same, and thus the relationships between the shape of the elastic projection 22 and the pressure values detected by the respective pressure sensors 12 are the same. It is thus easy to calculate the difference between the pressure values detected by random combinations of the pressure sensors 12 from among the pressure values of the pressure sensors 12. Note that a method for calculating the difference between pressure values will be described later.

The gap between adjacent pressure sensors 12 is approximately 0.1 mm. Accordingly, noise caused by the effects of disturbances, static electricity, and so on does not enter into the pressure values detected by the pressure sensors 12 that are in adjacent positions.

A total of four pressure sensors 12, or two rows in the depth direction and two columns in the width direction, are disposed per unit detection region S. The center of the four pressure sensors 12 (that is, the center of the unit detection region S) corresponds to the reference point P. The intensity of the unit detection region S (when viewed from above) is, for example, approximately 2.8 mm in the depth direction and 2.8 mm in the width direction. Furthermore, the surface area of each of the four pressure sensors 12 is approximately the same. A pressure-sensitive element such as a diaphragm gauge can be used as the pressure sensor 12. The pressure sensors 12 convert pressure applied to the diaphragm when an external pressure is acting on a contact surface into an electric signal.

The second substrate 20 is configured so as to include a rectangular plate-shaped second main substrate unit 21 and the plurality of elastic projections 22 disposed on the second main substrate unit 21. The second main substrate unit 21 is a portion that directly receives external pressures. The second main substrate unit 21 can be configured from a material such as glass, quartz, or plastic, or can be configured from a resinous material such as a urethane foam resin, a silicone resin, or the like. In this embodiment, a resinous material is used as the material for forming the second main substrate unit 21 and the elastic projections 22, and the second main substrate unit 21 and the elastic projections 22 are formed as a single integral unit using a metal mold. The plurality of elastic projections 22 are disposed in matrix form along the X direction and the Y direction in the second main substrate unit 21. The tip portions of the elastic projections 22 are spherical-shaped, and make contact with the first substrate 10 (and more specifically, with the plurality of pressure sensors 12 disposed upon the first main substrate unit 11). The elastic projections 22 are disposed in positions where the centers thereof initially overlap with the reference point P. Furthermore, the plurality of elastic projections 22 are disposed so as to be distanced from each other. Accordingly, when the elastic projections 22 elastically deforms, a certain amount of deformation in the direction parallel to the surface of the second main substrate unit 21 can be permitted.

The intensity of the elastic projections 22 can be set as desired. Here, the diameter of a base portion of the elastic projections 22 (that is, the diameter of the area where the elastic projections 22 make contact with the plurality of pressure sensors 12 on the surface of the first substrate 10) is approximately 1.8 mm. The height of the elastic projections 22 (that is, the distance of the elastic projections 22 in the Z direction) is approximately 2 mm. The gap between adjacent elastic projections 22 is approximately 1 mm. Finally, the durometer hardness of the elastic projections 22 (that is, a stiffness value measured by a type A, ISO 7619-compliant durometer) is approximately 30.

FIGS. 2A through 3C are descriptive diagrams illustrating a method for detecting the direction and intensity of an external pressure acting on the reference point P.

Figure 2A:
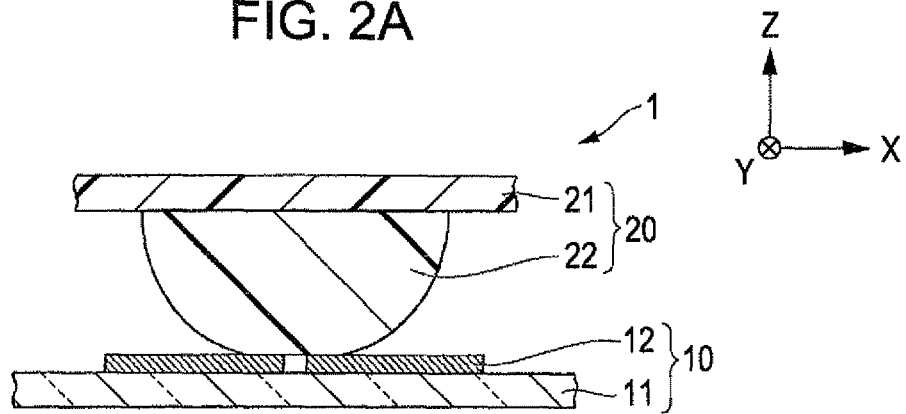
FIGS. 2A through 2C are cross-sectional views illustrating a change in pressure values taken by pressure sensors according to the first embodiment.
Figure 2B:
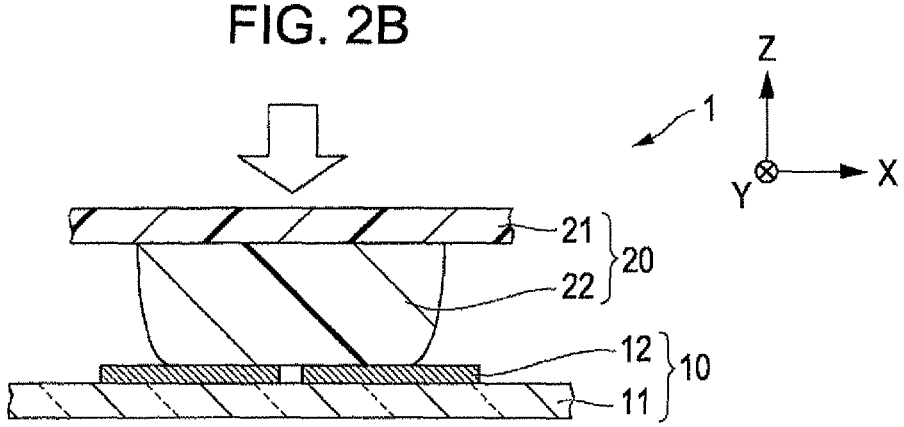
Figure 2C:
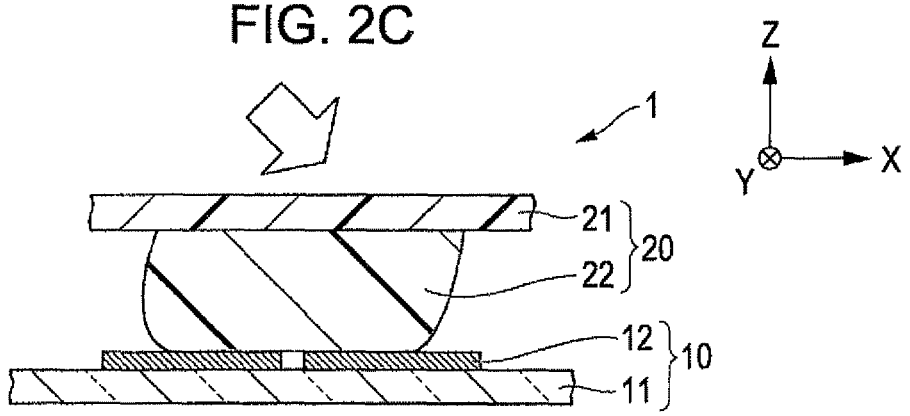
Figure 3A:
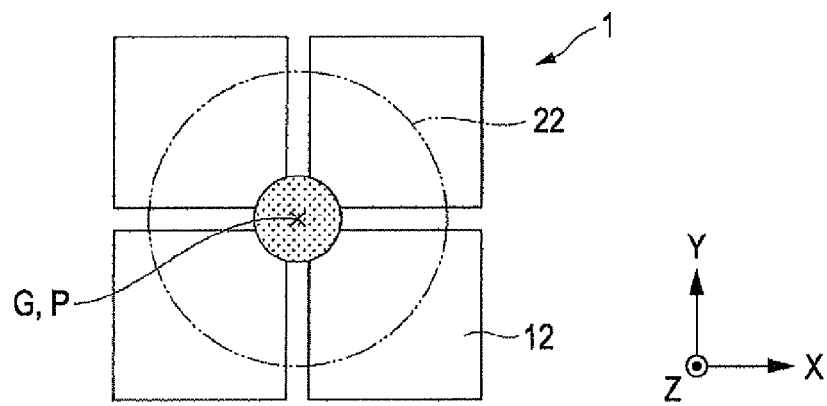
FIGS. 3A through 3C are plan views illustrating a change in pressure values taken by pressure sensors according to the first embodiment.
Figure 3B:
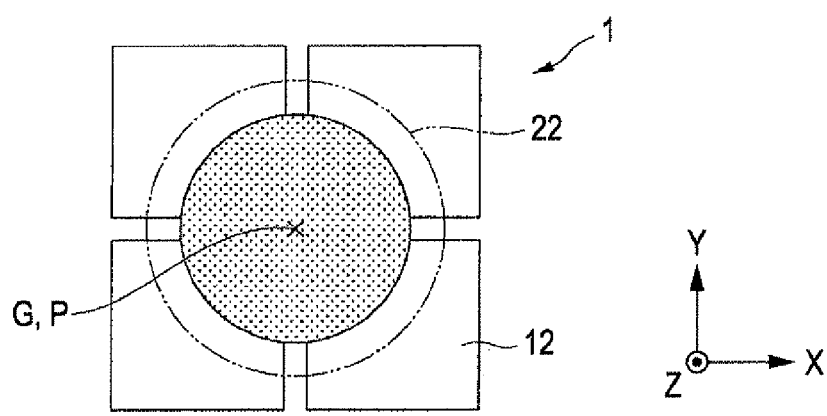
Figure 3C:
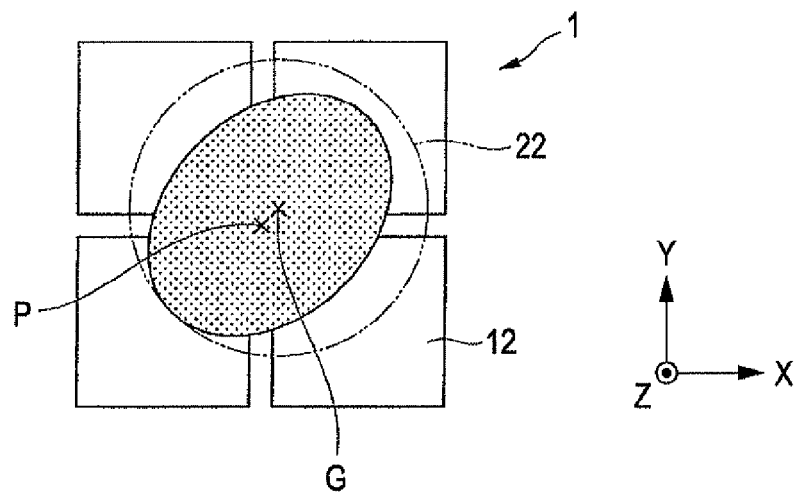

FIGS. 2A through 2C are cross-sectional views illustrating a change in pressure values taken by the pressure sensors according to the first embodiment. FIGS. 3A through 3C are plan views, corresponding to FIGS. 2A through 2C, illustrating a change in the pressure values taken by the pressure sensors according to the first embodiment. Note that FIG. 2A and FIG. 3A illustrate a state prior to an external pressure being applied to the surface of the second substrate 20 (that is, a state where there is no external pressure acting). FIG. 2B and FIG. 3B, meanwhile, illustrate a state in which an external pressure in the vertical direction (in a state in which there is no sliding force) is applied to the surface of the second substrate 20. FIG. 2C and FIG. 3C illustrate a state in which an external pressure in a diagonal direction (in a state in which there is a sliding force) is applied to the surface of the second substrate 20. Meanwhile, in FIGS. 3A through 3C, reference numeral G indicates the center (pressure center) of the elastic projection 22, a solid circle indicates an area contacted by the elastic projection 22 on the pressure sensors 12, and a two-dot chain line indicates an area disposed by the elastic projection 22.

As shown in FIG. 2A and FIG. 3A, the elastic projection 22 does not deform before an external pressure is applied to the surface of the second substrate 20. Accordingly, the distance between the first substrate 10 and the second substrate 20 is kept constant. At this time, the elastic projection 22 is disposed in a position where the center G thereof overlaps with the reference point P. The pressure values of the respective pressure sensors 12 at this time are stored in a memory (not shown). The direction, intensity, and so on of an acting external pressure is found using the pressure values of the pressure sensors 12 stored in the memory as a reference.

As shown in FIG. 2B and FIG. 3B, when an external pressure in the vertical direction is applied to the surface of the second substrate 20, the elastic projection 22 is compressed and deforms in the Z direction in a state in which the tip portion of the elastic projection 22 makes contact with the plurality of pressure sensors 12 disposed on the surface of the first substrate 10. Accordingly, the second substrate 20 bends in the −Z direction, and the distance between the first substrate 10 and the second substrate 20 decreases compared to the distance when the external pressure is not acting. The pressure values of the pressure sensors at this time are greater compared to the values when the external pressure is not acting. Furthermore, the amount of change thereof is approximately the same value for each of the pressure sensors.

As shown in FIG. 2C and FIG. 3C, when an external pressure in a diagonal direction is applied to the surface of the second substrate 20, the elastic projection 22 is compressed and deforms in a tilted manner, in a state in which the tip portion of the elastic projection 22 makes contact with the plurality of pressure sensors 12 disposed on the surface of the first substrate 10. Accordingly, the second substrate 20 bends in the −Z direction, and the distance between the first substrate 10 and the second substrate 20 decreases compared to the one when the external pressure is not acting. At this time, the center G of the elastic projection 22 shifts in the +X direction and the +Y direction from the reference point P. In this case, the tip portion of the elastic projection 22 overlaps with different amounts of surface area in each of the four pressure sensors 12. To be more specific, the tip portion of the elastic projection 22 overlaps with a greater surface area of the pressure sensors 12 disposed in the +X direction and the +Y direction than of the pressure sensors 12 disposed in the −X direction and the −Y direction.

The elastic projection 22 deforms in an unbalanced manner due to an external pressure in a diagonal direction. In other words, the center of the elastic projection 22 shifts from the reference point P and moves in a sliding direction (the X direction and the Y direction). As a result, different pressure values are detected by the respective pressure sensors. Specifically, a relatively large pressure value is detected by pressure sensors in positions that overlap with the center of the elastic projection 22, whereas a relatively small pressure value is detected by pressure sensors in positions that do not overlap with the center of the elastic projection 22. The direction and intensity at which the external pressure was applied is found based on a difference calculation method that will be described later.

Figure 4:
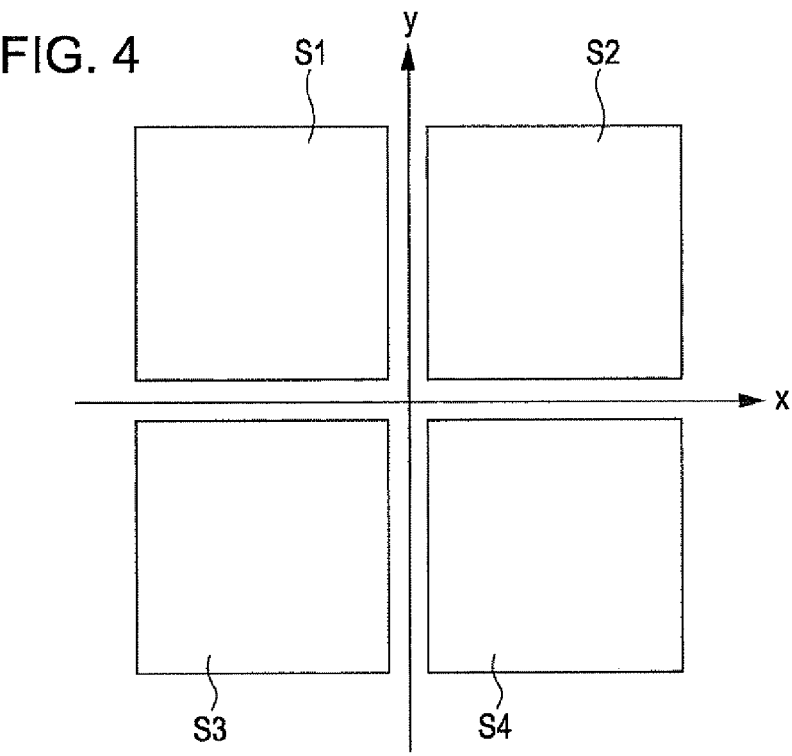
FIG. 4 is a diagram illustrating a coordinate system in a sensing region according to the first embodiment.
Figure 5:
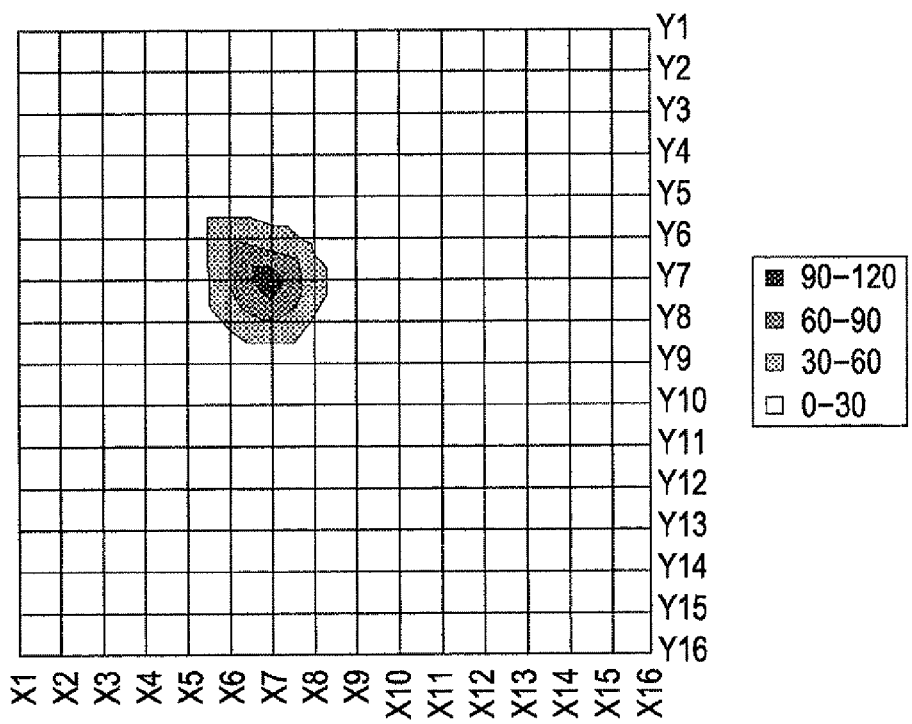
FIG. 5 is a diagram illustrating a pressure distribution in the vertical direction taken by pressure sensors according to the first embodiment.
Figure 6:
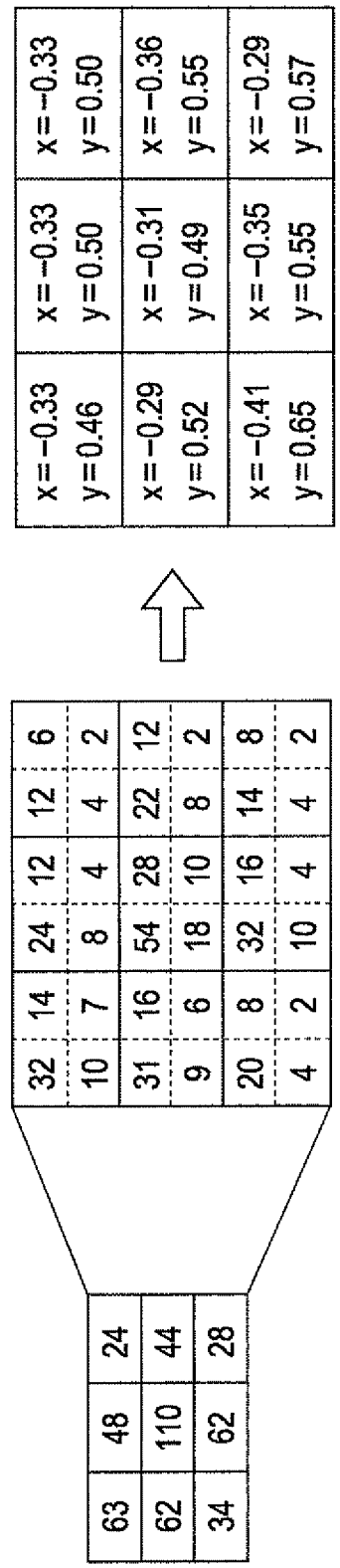
FIG. 6 is a diagram illustrating an example of calculating a sliding direction by pressure sensors according to the first embodiment.

FIG. 4 is a diagram illustrating a coordinate system in a sensing region according to the first embodiment. FIG. 5, meanwhile, is a diagram illustrating a pressure distribution in the vertical direction taken by the pressure sensors according to the first embodiment. FIG. 6 is a diagram illustrating an example of calculating a sliding direction by the pressure sensors according to the first embodiment.

As shown in FIG. 4, a total of four pressure sensors S1 through S4 are disposed per unit detection region S, with two rows in the depth direction and two columns in the width direction. Here, assuming that the pressure values detected by the pressure sensors S1 through S4 (that is, detected values) are PS1, PS2, PS3, and PS4, respectively, an X direction component Fx of the external force (that is, the rating amount of the directional component of the external force within the plane that acts in the X direction) is expressed by the following Formula 1.

$$F_x = \frac{(P_{S2} + P_{S4}) - (P_{S1} + P_{S3})}{P_{S1} + P_{S2} + P_{S3} + P_{S4}} \quad (1)$$

Furthermore, a Y direction component Fy of the external force (that is, the rating amount of the directional component of the external force within the plane that acts in the Y direction) is expressed by the following Formula 2.

$$F_y = \frac{(P_{S1} + P_{S2}) - (P_{S2} + P_{S4})}{P_{S1} + P_{S2} + P_{S3} + P_{S4}} \quad (2)$$

Finally, a Z direction component Fz of the external force (that is, the vertical direction component of the external force) is expressed by the following Formula 3.

$$F_z = P_{S1} + P_{S2} + P_{S3} + P_{S4} \quad (3)$$

In this embodiment, the difference between the pressure values detected by pressure sensors combined at random from among the pressure values detected by the four pressure sensors S1 through S4 when the elastic projection elastically deforms due to the external pressure is calculated, and the direction of the external pressure is calculated based on that difference.

As shown in Formula 1, for the X direction component Fx of the external pressure, of the pressure values detected by the four pressure sensors S1 through 54, the values detected by the pressure sensors S2 and S4 disposed in the +X direction are combined, and the values detected by the pressure sensors S1 and S3 disposed in the −X direction are combined. In this manner, the X direction component of the external pressure is found based on the difference between the pressure values in the combination of the pressure sensors S2 and S4 disposed in the +X direction and the pressure values in the combination of the pressure sensors S1 and S3 disposed in the −X direction.

As shown in Formula 2, for the Y direction component Fy of the external pressure, of the pressure values detected by the four pressure sensors S1 through S4, the values detected by the pressure sensors S1 and S2 disposed in the +Y direction are combined, and the values detected by the pressure sensors S3 and S4 disposed in the −Y direction are combined. In this manner, the Y direction component of the external pressure is found based on the difference between the pressure values in the combination of the pressure sensors S1 and S2 disposed in the +Y direction and the pressure values in the combination of the pressure sensors S3 and S4 disposed in the −Y direction.

As shown in Formula 3, for the Z direction component Fz of the external pressure, the total force is found by adding together the pressure values of the four pressure sensors S1 through S4. However, a greater detected value tends to be detected for the Z direction component Fz of the external pressure than for the X direction component Fx of the external pressure and the Y direction component Fy of the external pressure (component forces). For example, the detection sensitivity for the Z direction component Fz of the external pressure will increase if a stiff material is used for the elastic projection 22, the tip portion of the elastic projection 22 has a sharp shape, and so on. However, using a stiff material for the elastic projection 22 makes it difficult for the elastic projection 22 to deform and thus reduces the detected value in the external pressure within the plane. In addition, if the tip portion of the elastic projection 22 has a sharp shape, there are cases where (abnormally) strong tactile feedback will occur when the contact surface is touched with a finger. Accordingly, it is necessary to correct the detected values as appropriate using a correction coefficient determined based on the material, shape, and so on of the elastic projection 22 in order to align the detected value of the Z direction component Fz of the external pressure with the detected values of the X direction component Fx and the Y direction component Fy of the external pressure.

A case will now be considered in which a location to the upper-left of the center of the detection surface of a touchpad is pushed diagonally with a finger, as shown in FIG. 5. At this time, the external pressure in the vertical direction is greatest in the center of the area on which the external pressure acts (the output voltage of the pressure sensor is approximately 90 to 120 mV). The external pressure in the vertical direction is lower in the peripheral region following the center (approximately 60 to 90 mV), and is lower still in the outermost area (approximately 30 to 60 mV). Meanwhile, the region not pushed by the finger has a pressure sensor output voltage of approximately 0 to 30 mV. Note that it is assumed here that a plurality of unit detection regions (the region in which a total of four pressure sensors S1 through S4 are disposed, with two rows in the depth direction and two columns in the width direction) are disposed in matrix form in the touchpad (with, for example, a total of 225 regions, with 15 rows in the depth direction and 15 columns in the width direction).

A method for calculating the directional components of the external pressure within the surface (that is, the sliding direction) in the case where a location to the upper-left of the center of the detection surface of a touchpad is pushed diagonally with a finger, as shown in FIG. 6, will now be considered. It is assumed here that the pushing pressure of the finger as an external pressure (the external force) is acting on an area that is three rows in the depth direction and three columns in the width direction, from among the 15 rows in the depth direction and 15 columns in the width direction. Here, the external pressure in the vertical direction is, as same in FIG. 5, greatest at the center of the area in which the external pressure is acting (110 mV).

The unit detection regions disposed at three rows in the depth direction and three columns in the width direction each have the four pressure sensors S1 through S4; the difference between the pressure values detected by pressure sensors combined at random from among the pressure values detected by the pressure sensors S1 through S4 is calculated, and the direction of the external pressure is calculated based on that difference. In other words, in each unit detection region, the X direction component Fx of the external pressure and the Y direction component Fy of the external pressure are calculated based on the aforementioned Formula 1 and Formula 2. Here, it can be seen that, if the +X direction is taken as a reference, the external pressure is acting in the direction that is approximately 123° in the counterclockwise direction. Note that the direction in which the external pressure is acting can be calculated by using a method that finds the direction using the average value of the nine calculation results or a method that finds the direction from the maximum value (for example, a detected value that is greater than a predetermined threshold) in the nine calculation results.

According to the detection device 1 of this embodiment, the tip portion of the elastic projection 22 can deform in the sliding direction (a direction parallel to the surface of the pressure sensors 12) while making contact with the first substrate 10 (the plurality of pressure sensors 12), and thus the precision with which the direction and intensity of the external pressure is detected can be increased compared to the detection devices disclosed in JP-A-60-135834 and JP-A-7-128163. When an external pressure is applied to the surface of the second substrate 20, the elastic projection 22 is compressed and deforms in a state in which the tip portion of the elastic projection 22 makes contact with the plurality of pressure sensors 12 disposed on the surface of the first substrate 10. Here, in the case where there is a sliding force component in a predetermined direction along the surface, the elastic projection 22 deforms in an unbalanced manner. In other words, the center of the elastic projection 22 shifts from the reference point P and moves in a predetermined direction (the sliding direction). Upon doing so, the ratio of pressure sensors 12 that overlap with areas in which the center of the elastic projection 22 has moved becomes relatively greater. In other words, different pressure values are detected by the respective pressure sensors S1 through S4. Specifically, a relatively large pressure value is detected by pressure sensors 12 in positions that overlap with the center of the elastic projection 22, whereas a relatively small pressure value is detected by pressure sensors 12 in positions that do not overlap with the center of the elastic projection 22. Accordingly, the calculation device can calculate the difference between the pressure values detected by the respective pressure sensors S1 through S4 and find the direction and intensity of the external pressure based on that difference. It is therefore possible to provide the detection device 1, which is capable of detecting the direction and intensity of an external pressure with high precision.

According to this configuration, the plurality of pressure sensors 12 are disposed symmetrically with the reference point P serving as the point of symmetry, and thus the distances between the reference point P and each of the pressure sensors 12 are the same. Accordingly, the relationships between the amount of deformation of the elastic projection 22 and the pressure values detected by the respective pressure sensors S1 through S4 are the same. For example, in the case where a plurality of pressure sensors are disposed at different distances from a reference point, the pressure values detected by the respective pressure sensors will differ from each other even if the amount of deformation of the elastic projection 22 is the same. Accordingly, when calculating the difference between detected values, a correction coefficient based on the disposal locations of the pressure sensors S1 through S4 is necessary. However, according to this configuration, the relationships between the amount of deformation of the elastic projection 22 and the pressure values detected by the respective pressure sensors S1 through S4 are the same, and thus the stated correction coefficient is unnecessary. Accordingly, it is easier to calculate the direction and intensity of the external pressure based on the differences between the pressure values of the pressure sensors S1 through S4, which makes it possible to detect the external pressure in an efficient manner.

Furthermore, according to this configuration, the plurality of pressure sensors 12 are arranged in matrix form in two directions that are orthogonal to each other, and therefore it is easy to calculate the direction and intensity of the external pressure based on the differences between the pressure values of pressure sensors 12 combined at random, from among the pressure values detected by the pressure sensors S1 through S4. For example, when calculating the X direction component of the directional components within the plane, it is easier to separate the pressure sensors S2 and S4 disposed relatively in the +X direction into one combination and the pressure sensors S1 and S3 disposed relatively in the −X direction into another combination, and select the sensors, as compared to a case where the plurality of pressure sensors 12 are disposed at random in a plurality of directions. Accordingly, external pressure can be detected efficiently.

According to this configuration, the plurality of elastic projections 22 are disposed with gaps between each other, and thus when the elastic projections 22 elastically deform, a certain amount of deformation in the direction parallel to the surface of the second main substrate unit 21 can be permitted. For example, it is possible to suppress the influence of the deformation of one of the elastic projections 22 when another elastic projection 22 has deformed. Accordingly, an external pressure can be transmitted to the pressure sensors S1 through S4 more precisely, compared to a case in which the plurality of elastic projections 22 are disposed so as to make contact with each other. Accordingly, it is possible to detect the direction and intensity of the external pressure with high precision.

Although this embodiment describes an example in which a total of four pressure sensors 12 are disposed per unit detection region S, with two rows in the depth direction and two columns in the width direction, the invention is not limited thereto. Any number can be employed as long as there are three or more pressure sensors 12 disposed per unit detection region S.

Second Embodiment

Figure 7:
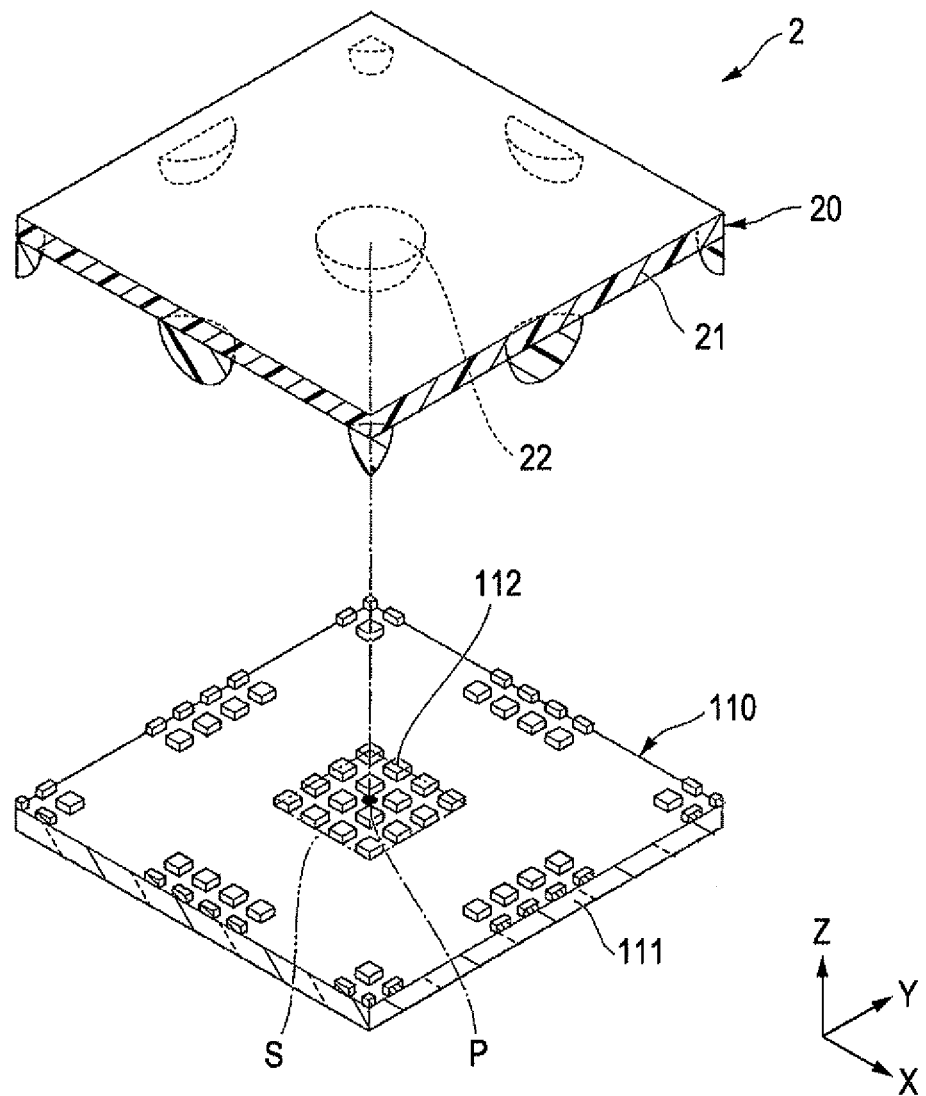
FIG. 7 is an exploded perspective view illustrating the overall configuration of a detection device according to a second embodiment of the invention.

FIG. 7 is an exploded perspective view, corresponding to FIG. 1, illustrating the overall configuration of a detection device 2 according to a second embodiment of the invention. In FIG. 7, reference numeral P indicates a reference point, whereas reference numeral S indicates a unit detection region on which a plurality of pressure sensors 112 disposed in correspondence to a single elastic projection 22 carry out detection. The detection device 2 according to this embodiment differs from the detection device 1 described in the aforementioned first embodiment in that the plurality of pressure sensors 112 are disposed in two directions that are orthogonal to each other, with at least four rows in the depth direction and four columns in the width direction. In FIG. 7, elements identical to those in FIG. 1 are given identical reference numerals, and detailed descriptions thereof will be omitted. In FIG. 7, the plurality of pressure sensors 112 are illustrated as being disposed with four rows in the depth direction and four columns in the width direction per unit detection region S for the sake of simplicity; however, it should be noted that in reality, the plurality of pressure sensors 112 may be disposed with more than four rows in the depth direction and four columns in the width direction per unit detection region S, shown in FIG. 8 and FIG. 9.

As shown in FIG. 7, the detection device 2 includes a first substrate 110 that has the plurality of pressure sensors 112 disposed around the reference point P, and a second substrate 20 in which the elastic projection 22, which is disposed with its center in a position that overlaps with the position of the reference point P and which elastically deforms due to the external pressure in a state in which the tip portion of the elastic projection 22 makes contact with the plurality of pressure sensors 12 disposed on the surface of the first substrate 110.

The plurality of pressure sensors 112 are disposed in two directions that are orthogonal to each other (the X direction and the Y direction), with a total of at least 16 sensors disposed with four rows in the depth direction and four columns in the width direction. Specifically, a total of 16 pressure sensors 112, or four rows in the depth direction and four columns in the width direction, are disposed per unit detection region S. The center of the 16 pressure sensors 112 (that is, the center of the unit detection region S) corresponds to the reference point P.

Figure 8A:
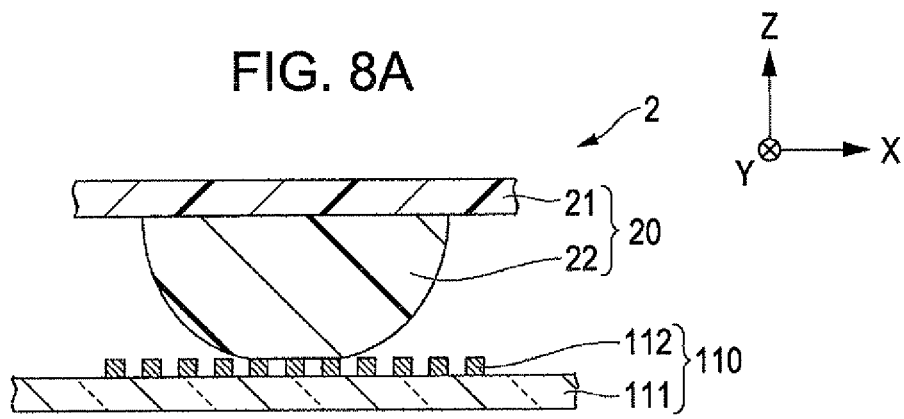
FIGS. 8A through 8C are cross-sectional views illustrating a change in pressure values taken by pressure sensors according to the second embodiment.
Figure 8B:
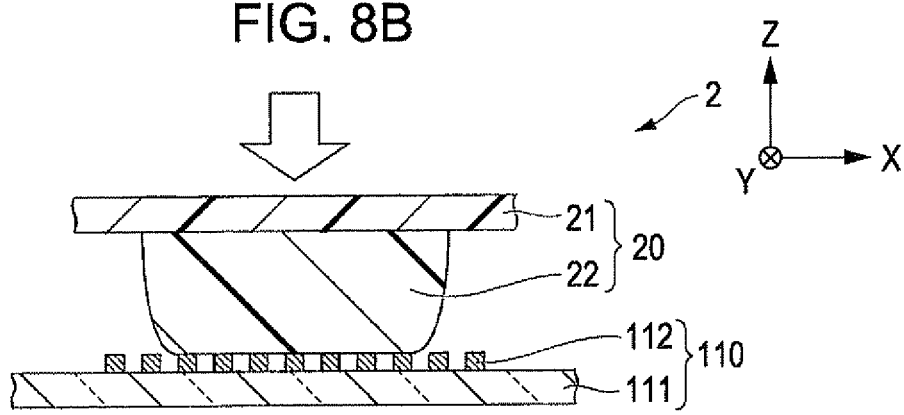
Figure 8C:
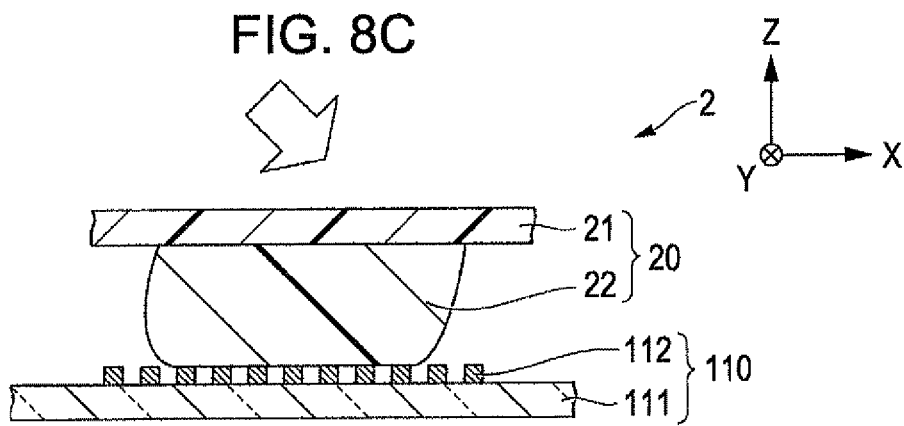
Figure 9A:
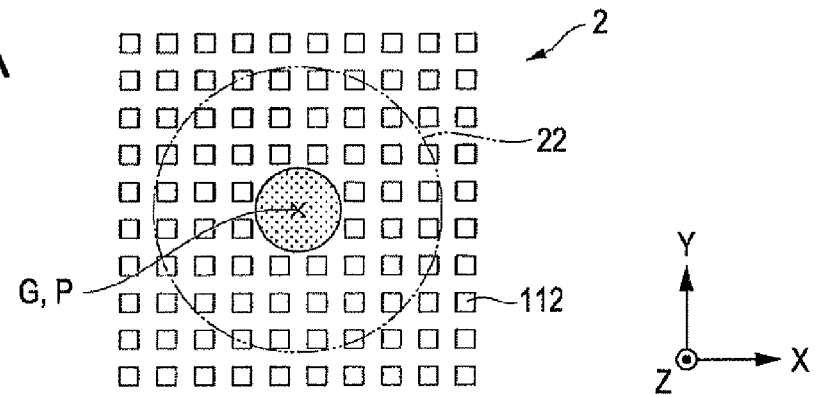
FIGS. 9A through 9C are plan views illustrating a change in pressure values taken by pressure sensors according to the second embodiment.
Figure 9B:
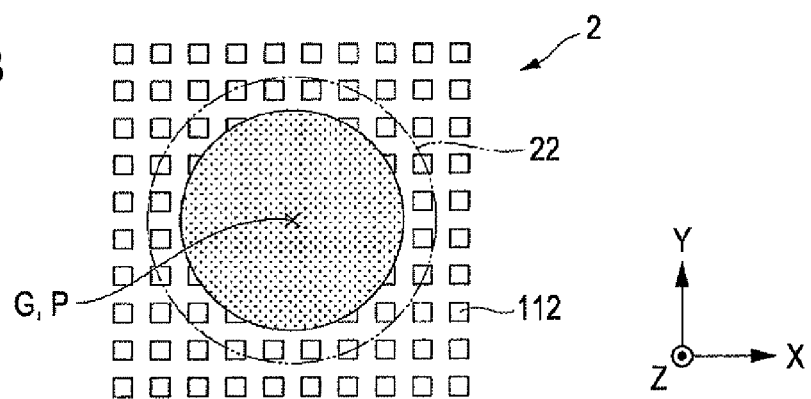
Figure 9C:
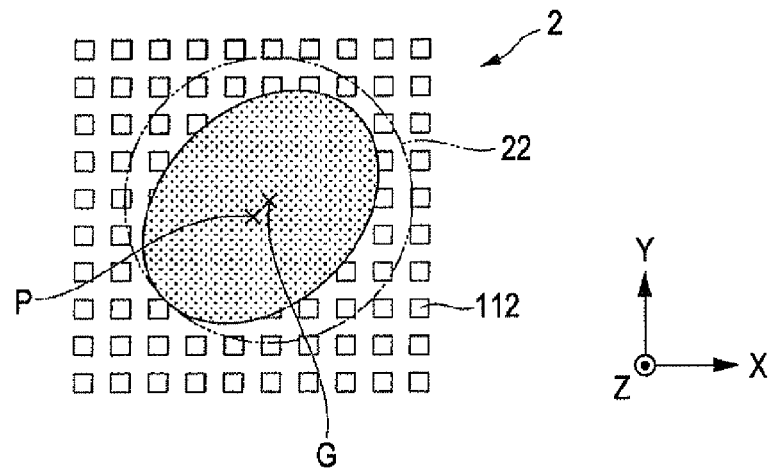

FIGS. 8A through 8C are cross-sectional views, corresponding to FIGS. 2A through 2C, illustrating a change in pressure values taken by the pressure sensors according to the second embodiment. FIGS. 9A through 9C are plan views, corresponding to FIGS. 8A through 8C, illustrating a change in the pressure values taken by the pressure sensors according to the second embodiment. Note that FIG. 8A and FIG. 9A illustrate a state prior to an external pressure being applied to the surface of the second substrate 20 (that is, a state where there is no external pressure acting). FIG. 8B and FIG. 9B, meanwhile, illustrate a state in which an external pressure in the vertical direction is applied to the surface of the second substrate 20. FIG. 8C and FIG. 9C illustrate a state in which an external pressure in a diagonal direction is applied to the surface of the second substrate 20. Meanwhile, in FIGS. 9A through 9C, reference numeral G indicates the center of the elastic projection 22, a solid circle indicates an area contacted by the elastic projection 22 on the pressure sensors 12, and a two-dot chain line indicates an area disposed by the elastic projection 22. In FIGS. 8A through 9C, elements identical to those in FIGS. 2A through 3C are given identical reference numerals, and detailed descriptions thereof will be omitted.

As shown in FIG. 8A and FIG. 9A, the elastic projection 22 does not deform before an external pressure is applied to the surface of the second substrate 20. Accordingly, the distance between the first substrate 110 and the second substrate 20 is kept constant. At this time, the elastic projection 22 is disposed in a position where the center G thereof overlaps with the reference point P. The pressure values of the respective pressure sensors 112 at this time are stored in a memory (not shown). The direction, intensity, and so on of an acting external pressure are found using the pressure values of the pressure sensors 112 stored in the memory as a reference.

As shown in FIG. 8B and FIG. 9B, when an external pressure in the vertical direction is applied to the surface of the second substrate 20, the elastic projection 22 is compressed and deforms in the Z direction in a state in which the tip portion of the elastic projection 22 makes contact with the plurality of pressure sensors 112 disposed on the surface of the first substrate 110. Accordingly, the second substrate 20 bends in the −Z direction, and the distance between the first substrate 110 and the second substrate 20 decreases compared to when the external pressure is not acting. The pressure values detected by the pressure sensors 112 at this time are greater compared to when the external pressure is not acting. Furthermore, the amount of change thereof is approximately the same value for each of the pressure sensors.

As shown in FIG. 8C and FIG. 9C, when an external pressure in a diagonal direction is applied to the surface of the second substrate 20, the elastic projection 22 is compressed and deforms in a tilted manner, in a state in which the tip portion of the elastic projection 22 makes contact with the plurality of pressure sensors 112 disposed on the surface of the first substrate 110. Accordingly, the second substrate 20 bends in the −Z direction, and the distance between the first substrate 110 and the second substrate 20 decreases compared to when the external pressure is not acting. Meanwhile, the amount by which the second substrate 20 bends is greater in the +X direction component than in the −X direction component. At this time, the center G of the elastic projection 22 shifts in the +X direction and the +Y direction from the reference point P. In this case, the percentage of the surface area of the tip portion of the elastic projection 22 that overlaps with the plurality of pressure sensors 112 is greater for the tip portion that overlaps with the sensors disposed in the +X direction and the +Y direction than for the tip portion that overlaps with the sensors disposed in the −X direction and the −Y direction.

Figure 10:
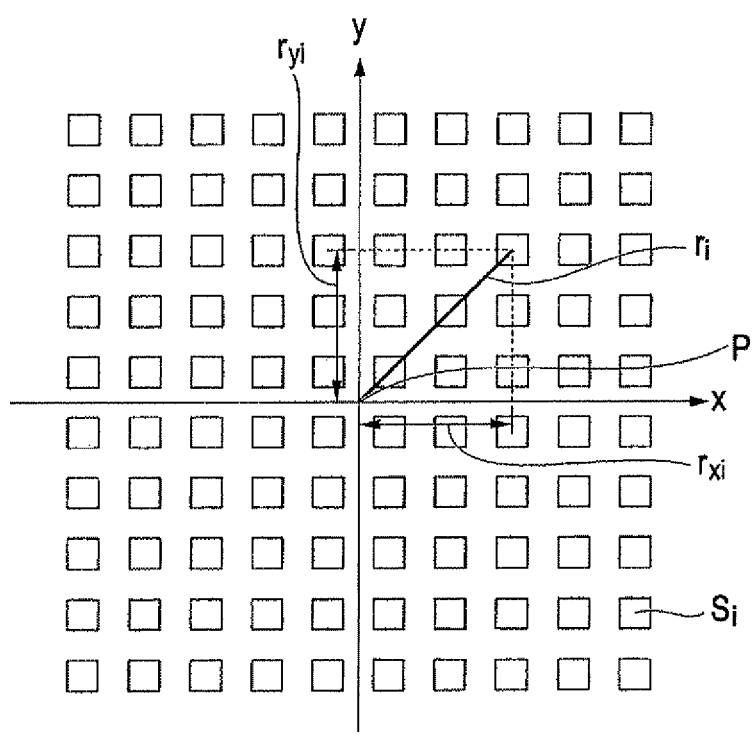
FIG. 10 is a diagram illustrating a coordinate system in a sensing region according to the second embodiment.

FIG. 10 is a diagram, corresponding to FIG. 4, illustrating a coordinate system in a sensing region according to the second embodiment. Note that in FIG. 10, a plurality of pressure sensors $S_i$ (100 sensors) are disposed in matrix form, with 25 each of the pressure sensors $S_i$ being disposed in the region located in the −X direction and the +Y direction, the region located in the +X direction and the +Y direction, the region located in the −X direction and the −Y direction, and the region located in the +X direction and the −Y direction. Furthermore, although 100 pressure sensors $S_i$ are illustrated in FIG. 10 for the sake of simplicity, the number of the pressure sensors $S_i$ that are provided is not limited thereto, and can be altered as desired.

As shown in FIG. 10, a total of 100 pressure sensors $S_i$ are disposed per unit detection region S, with ten rows in the depth direction and ten columns in the width direction. Here, it is assumed that the pressure value detected by each pressure sensor $S_i$ (that is, the detected value) is $P_i$ (where i=1 to 100), and that the directional components within the surface for the distances between the reference point P and the respective pressure sensors $S_i$ are $r_i$ (where i=1 to 100). Furthermore, assuming that the X direction component of the directional components within the surface is $r_{xi}$ (where i=1 to 100) and the Y direction component of the directional components within the surface is $r_{yi}$ (where i=1 to 100), an X direction component Fx of the external force (that is, the rating amount of the directional component of the external force within the plane that acts in the X direction) is expressed by the following Formula 4.

$$F_x = \frac{\sum_i P_i r_{xi}}{\sum_i P_i} \quad (4)$$

Furthermore, a Y direction component Fy of the external force (that is, the rating amount of the directional component of the external force within the plane that acts in the Y direction) is expressed by the following Formula 5.

$$F_y = \frac{\sum_i P_i r_{yi}}{\sum_i P_i} \quad (5)$$

Finally, a Z direction component Fz of the external force (that is, the vertical direction component of the external force) is expressed by the following Formula 6.

$$Fz = \sum_i P_i \quad \wedge \quad (6)$$

In this embodiment, the difference between the pressure values detected by pressure sensors $S_i$ combined at random from among the pressure values detected by the 100 pressure sensors $S_i$ when the elastic projection elastically deforms due to the external pressure is calculated, and the direction of the external pressure is calculated based on that difference.

As shown in Formula 4, for the X direction component Fx of the external pressure, of the pressure values detected by the 100 pressure sensors Si, the values detected by the pressure sensors $S_i$ disposed relatively in the +X direction are combined, and the values detected by the pressure sensors $S_i$ disposed relatively in the −X direction are combined. In this manner, the X direction component of the external pressure is found based on the difference between the pressure values in the combination of the pressure sensors $S_i$ disposed relatively in the +X direction and the pressure values in the combination of the pressure sensors $S_i$ disposed relatively in the −X direction.

As shown in Formula 5, for the Y direction component Fy of the external pressure, of the pressure values detected by the 100 pressure sensors Si, the values detected by the pressure sensors $S_i$ disposed relatively in the +Y direction are combined, and the values detected by the pressure sensors $S_i$ disposed relatively in the −Y direction are combined. In this manner, the Y direction component of the external pressure is found based on the difference between the pressure values in the combination of the pressure sensors $S_i$ disposed relatively in the +Y direction and the pressure values in the combination of the pressure sensors S, disposed relatively in the −Y direction.

As shown in Formula 6, for the Z direction component Fz of the external pressure, the total force is found by adding together the pressure values of the 100 pressure sensors $S_i$. However, a greater detected value tends to be detected for the Z direction component Fz of the external pressure than for the X direction component Fx of the external pressure and the Y direction component Fy of the external pressure. Accordingly, it is necessary to correct the detected values as appropriate using a correction coefficient determined based on the material, shape, and so on of the elastic projection 22 in order to align the detected value of the Z direction component Fz of the external pressure with the detected values of the X direction component Fx and the Y direction component Fy of the external pressure.

Note that the direction in which the external pressure is acting can be calculated by using a method that finds the direction using the average value of the calculation results for the pressure values detected by the 100 pressure sensors $S_i$ or a method that finds the direction from the maximum value (for example, a detected value that is greater than a predetermined threshold) in the calculation results for the pressure values detected by the 100 pressure sensors $S_i$.

According to the detection device 2 of this embodiment, the plurality of pressure sensors 112 are disposed in two directions that are orthogonal to each other, with at least four rows in the depth direction and four columns in the width direction, and thus there is a higher number of pressure sensors 112 disposed. For this reason, the direction and intensity of the external pressure can be found by calculating the accumulation of the detection results of the pressure sensors 112 based on the pressure values detected by the high number of pressure sensors 112. Accordingly, it is possible to detect the direction of the external pressure with high precision.

Third Embodiment

Figure 11:
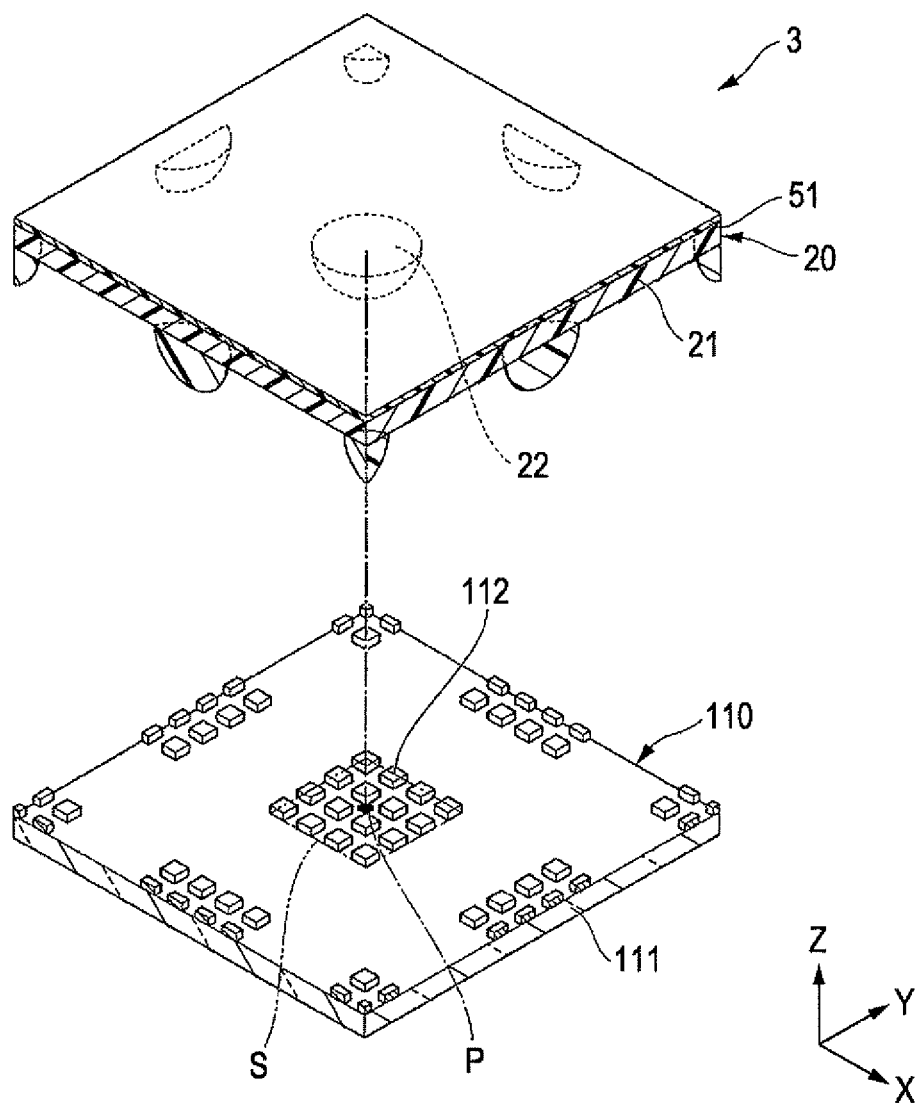
FIG. 11 is an exploded perspective view illustrating the overall configuration of a detection device according to a third embodiment of the invention.

FIG. 11 is an exploded perspective view, corresponding to FIG. 7, illustrating the overall configuration of a detection device 3 according to a third embodiment of the invention. In FIG. 11, reference numeral P indicates a reference point, whereas reference numeral S indicates a unit detection region on which the plurality of pressure sensors 112 disposed in correspondence to a single elastic projection 22 carry out detection. The detection device 3 according to this embodiment differs from the detection device 2 described in the aforementioned second embodiment in that a reinforcing member 51 that is more resilient than the second main substrate unit 21 is disposed on the surface of the second substrate 20. In FIG. 11, elements identical to those in FIG. 7 are given identical reference numerals, and detailed descriptions thereof will be omitted.

As shown in FIG. 11, the detection device 3 includes: the first substrate 110 that has the plurality of pressure sensors 112 disposed around the reference point P; the second substrate 20 on which the elastic projection 22 is formed, elastically deforming due to the external pressure in a state in which the tip portion thereof makes contact with the plurality of pressure sensors 12 disposed on the surface of the first substrate 110 and being disposed with its center in a position that overlaps with the position of the reference point P; and the reinforcing member 51, which is disposed on the opposite side of the second substrate 20 to the side on which the elastic projection 22 is disposed.

The reinforcing member 51 is rectangular, and is formed so as to have the same size as the second main substrate unit 21 when viewed from above. The reinforcing member 51 is more resilient than the second main substrate unit 21. For example, in the case where the material of the second main substrate unit 21 is, like the material of the elastic projection 22, a urethane foam resin (with a durometer hardness of approximately 30), an epoxy resin, a urethane resin, or the like (with a durometer hardness of approximately 60) can be used as the material of which the reinforcing member 51 is formed. Accordingly, an external pressure can be detected accurately even in the case where an external force has been applied by an object that is smaller than the interval at which the elastic projections 22 are disposed on the contact surface (for example, a sharp-tipped stylus).

Figure 12A:
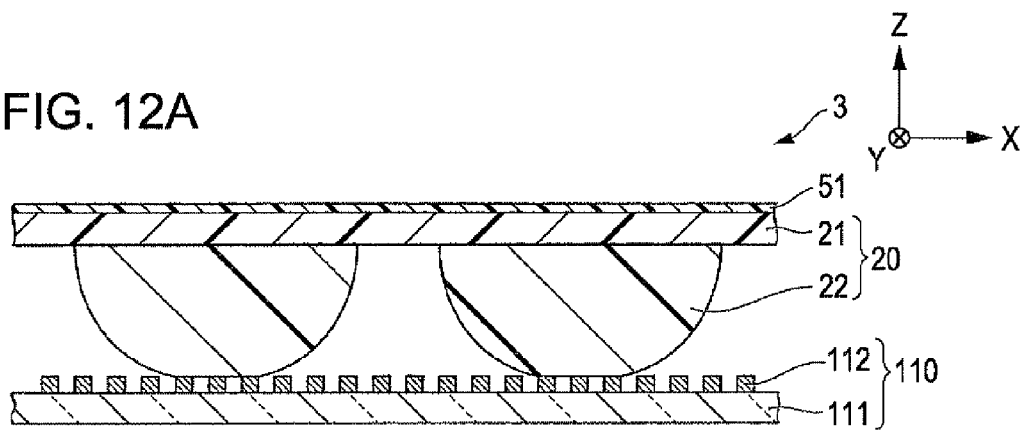
FIGS. 12A through 12C are cross-sectional views illustrating a change in pressure values taken by pressure sensors according to the third embodiment.
Figure 12B:
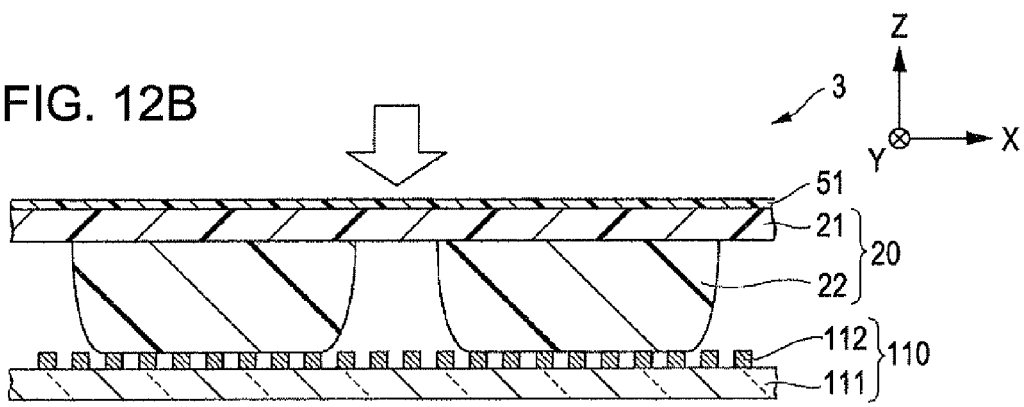
Figure 12C:
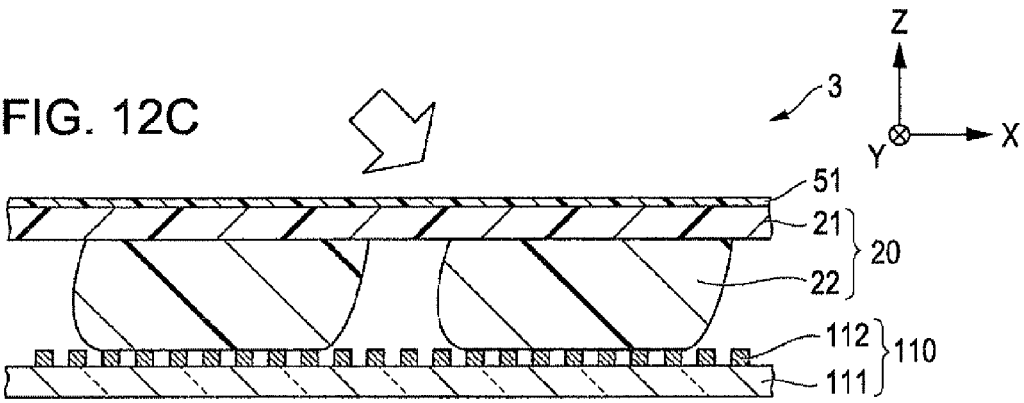

FIGS. 12A through 12C are cross-sectional views, corresponding to FIGS. 8A through 8C, illustrating a change in pressure values taken by the pressure sensors according to the third embodiment. Note that FIG. 12A illustrates a state prior to an external pressure being applied to the surface of the second substrate 20 (the surface of the reinforcing member 51) (that is, a state where there is no external pressure acting). FIG. 12B, meanwhile, illustrates a state in which an external pressure in the vertical direction is applied to the surface of the second substrate 20. FIG. 12C illustrates a state in which an external pressure in a diagonal direction is applied to the surface of the second substrate 20. In FIG. 12, elements identical to those in FIG. 8 are given identical reference numerals, and detailed descriptions thereof will be omitted.

As shown in FIG. 12A, the elastic projection 22 does not deform before an external pressure is applied to the surface of the second substrate 20. Accordingly, the distance between the first substrate 110 and the second substrate 20 is kept constant. The pressure values detected by the respective pressure sensors 112 at this time are stored in a memory (not shown). The direction, intensity, and so on of an acting external pressure is found using the pressure values detected by the pressure sensors 112 and stored in the memory as a reference.

As shown in FIG. 12B, when an external pressure in the vertical direction is applied to the surface of the second substrate 20, the elastic projection 22 is compressed and deforms in the Z direction in a state in which the tip portion of the elastic projection 22 makes contact with the plurality of pressure sensors 112 disposed on the surface of the first substrate 110. Accordingly, the second substrate 20 bends in the −Z direction, and the distance between the first substrate 110 and the second substrate 20 decreases compared to when the external pressure is not acting. The pressure values detected by the pressure sensors 112 at this time are greater compared to when the external pressure is not acting.

The external pressure also acts in regions between two adjacent elastic projections 22. However, because the reinforcing member 51, which is more resilient than the second main substrate unit 21, is disposed on the surface of the second substrate 20 in this embodiment, in the case where, for example, the detection device 3 has been pressed in the vertical direction with a finger, the two adjacent elastic projections 22 both are compressed and deform in the vertical direction. Accordingly, it is possible to suppress the two adjacent elastic projections 22 from being compressed and deforming in directions opposite to each other due to the external force, as compared to the case where the reinforcing member 51 is not provided.

As shown in FIG. 12C, when an external pressure in a diagonal direction is applied to the surface of the second substrate 20, the elastic projection 22 is compressed and deforms in a tilted manner, in a state in which the tip portion of the elastic projection 22 makes contact with the plurality of pressure sensors 112 disposed on the surface of the first substrate 110. Accordingly, the second substrate 20 bends in the −Z direction, and the distance between the first substrate 110 and the second substrate 20 decreases compared to when the external pressure is not acting. Meanwhile, the amount by which the second substrate 20 bends is greater in the +X direction component than in the −X direction component. At this time, the center G of the elastic projection 22 shifts in the +X direction and the +Y direction from the reference point P.

The external pressure also acts in regions between two adjacent elastic projections 22. However, because the reinforcing member 51, which is more resilient than the second main substrate unit 21, is disposed on the surface of the second substrate 20 in this embodiment, in the case where, for example, the detection device 3 has been pressed in a diagonal direction with a finger, the two adjacent elastic projections 22 both are compressed and deform in the diagonal direction. Accordingly, it is possible to suppress the two adjacent elastic projections 22 from being compressed and deforming in directions opposite to each other due to the external force, as compared to the case where the reinforcing member 51 is not provided.

According to the detection device 3 of this embodiment, the reinforcing member 51, which is more resilient than the second main substrate unit 21, is disposed on the opposite side of the second substrate 20 to the side on which the elastic projection 22 is disposed, and thus the direction of an external pressure can be detected with higher precision. For example, in the case where the external pressure acts in a region between two adjacent elastic projections 22, it is possible to suppress the two adjacent elastic projections 22 from being compressed and deforming in directions opposite to each other, as compared to the case where the reinforcing member is not provided. In other words, it is possible to suppress mistaken detections in which the direction opposite to the direction of the external pressure is detected. Accordingly, it is possible to detect the direction and intensity of the external pressure with high precision.

Although the reinforcing member 51 is disposed on the surface of the second substrate 20 in this embodiment, the invention is not limited thereto. For example, rather than providing the reinforcing member 51, the second main substrate unit 21 itself may be formed of a material that is more resilient than the elastic projections 22. This makes it possible to achieve a thinner size for the device, as compared to the case where the reinforcing member 51 is provided.

Electronic Apparatuses

Figure 13:
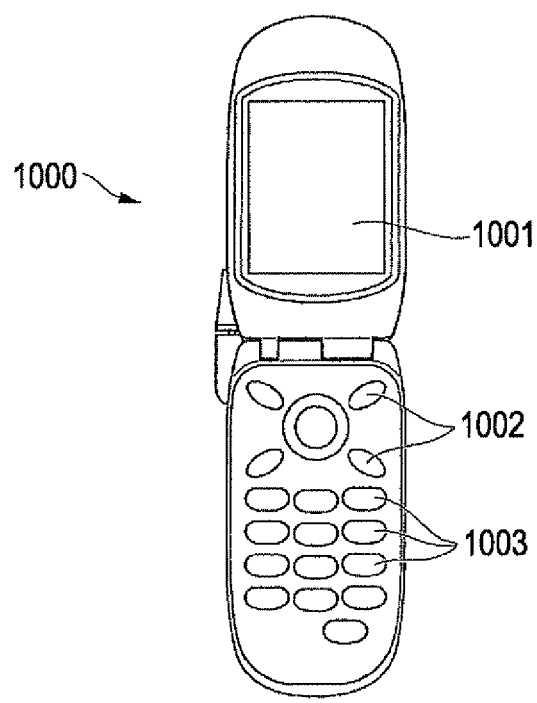
FIG. 13 is a schematic diagram illustrating the overall configuration of a mobile telephone serving as an example of an electronic apparatus.

FIG. 13 is a schematic diagram illustrating the overall configuration of a mobile telephone 1000 in which one of the detection devices 1 through 3 according to the aforementioned embodiments has been applied. The mobile telephone 1000 includes a plurality of operation buttons 1003, scroll buttons 1002, and a liquid-crystal panel 1001, in which the detection device serving as a display unit has been applied. Operating the scroll buttons 1002 scrolls the screen displayed in the liquid-crystal panel 1001. A menu button (not shown) is displayed in the liquid-crystal panel 1001. For example, a contact list is displayed, the telephone number of the mobile telephone is displayed, and so on when the menu button is touched with a finger.

Figure 14:
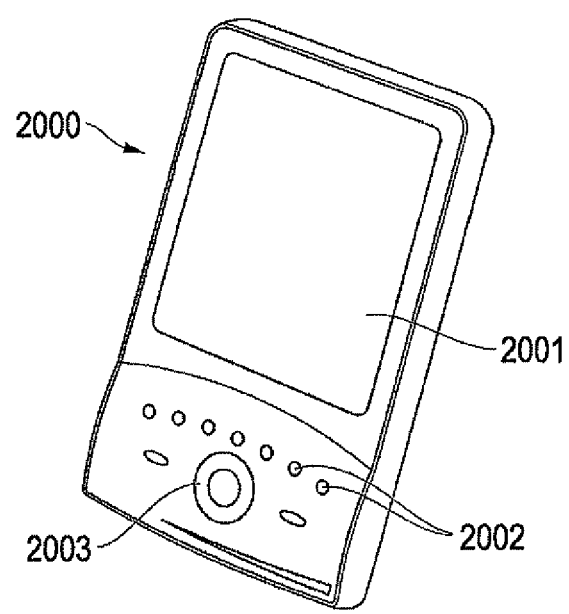
FIG. 14 is a schematic diagram illustrating the overall configuration of a personal digital assistant serving as an example of an electronic apparatus.

FIG. 14 is a schematic diagram illustrating the overall configuration of a personal digital assistant (PDA) 2000 in which one of the detection devices 1 through 3 according to the aforementioned embodiments has been applied. The personal digital assistant 2000 includes a plurality of operation buttons 2002, a power switch 2003, and a liquid-crystal panel 2001, in which the detection device serving as a display unit has been applied. When the power switch 2003 is operated, a menu button is displayed in the liquid-crystal panel 2001. For example, address records are displayed, a schedule is displayed, or the like when the menu button (not shown) is touched with a finger.

According to such an electronic apparatus, the aforementioned detection device is provided, and it is thus possible to provide an electronic apparatus capable of detecting the direction and intensity of an external pressure with high precision.

It should be noted that the following apparatuses can also be given as examples of electronic apparatuses: personal computers; video camera monitors; car navigation systems; pagers; electronic notepads; calculators; word processors; workstations; videophones; POS terminals; digital still cameras; apparatuses that include touch panels, and so on. The detection device according to the invention can be applied to these electronic apparatuses as well.

Robot

Figure 15A:
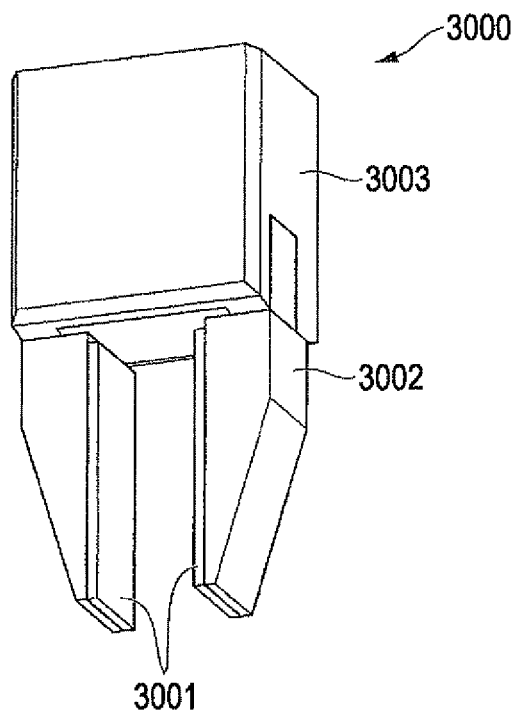
FIGS. 15A and 15B are schematic diagrams illustrating the overall configuration of a robot hand serving as an example of a robot.
Figure 15B:
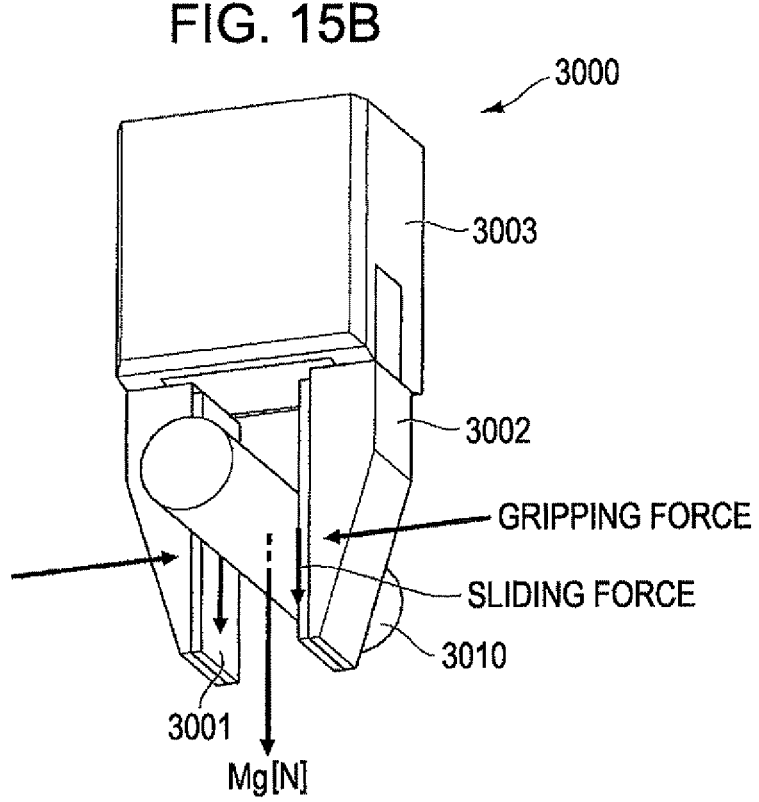

FIGS. 15A and 15B are schematic diagrams illustrating the overall configuration of a robot hand 3000 in which one of the detection devices 1 through 3 according to the aforementioned embodiments has been applied. As shown in FIG. 15A, the robot hand 3000 includes a main body portion 3003 and a pair of arm portions 3002, as well as gripping portions 3001 in which the detection device has been applied. Note that the arm portions 3002 open and close when a driving signal has been sent to the arm portions 3002 by a control apparatus such as a remote controller.

A case in which an object 3010 such as a cup is gripped by the robot hand 3000 will be considered, as shown in FIG. 15B. Here, the force acting on the object 3010 is detected as pressure by the gripping portions 3001. Because the robot hand 3000 includes the stated detection device as the gripping portions 3001, the robot hand 3000 can detect forces in the direction perpendicular to the surface of the object 3010 (the contact surface) along with the force in which the object 3010 slides under gravity Mg (that is, the sliding force component). For example, the robot hand 3000 can hold the object 3010 with a reduced force in accordance with the qualities of the object 3010, so as not to cause soft objects to deform, drop slippery objects, and so on.

According to such a robot, the aforementioned detection device is provided, and it is thus possible to provide a robot capable of detecting the direction and intensity of an external pressure with high precision.

The entire disclosure of Japanese Patent Application No. 2010-166791, filed Jul. 26, 2010 and Japanese Patent Application No. 2011-140619, filed Jun. 24, 2011 are expressly incorporated by reference herein.

What is claimed is:

1. A detection device comprising:
    a first substrate on which is arranged a plurality of pressure sensors; and
    a second substrate having:
        an elastic projection that is elastically deformed in a state in which its tip end portion contacts each of the pressure sensors due to external pressure; and
        a support substrate arranged on a side opposite to the first substrate with respect to the elastic projection,
    the plurality of pressure sensors being disposed symmetrically, with a contact part serving as the point of symmetry,
    the plurality of pressure sensors being disposed in matrix form in two directions that are orthogonal to each other, and
    the direction of the external pressure being defined by a component in an x-direction (Fx), a component in a y-direction (Fy), and a component in a z-direction (Fz) based on the following formulas:

$$F_x = \frac{\sum_i P_i r_{xi}}{\sum_i P_i}; F_y = \frac{\sum_i P_i r_{yi}}{\sum_i P_i}; \text{ and } F_z = \frac{\sum_i P_i r_{zi}}{\sum_i P_i}$$

where $P_i$ is the detected value at each sensor, i=total number of sensors, $r_{xi}$ is a distance between the contact part and a respective sensor in the x-direction; $r_{yi}$ is a distance between the contact part and a respective sensor in the y-direction; and $r_{zi}$ a distance between the contact part and a respective sensor in a z-direction.

2. The detection device according to claim 1, further comprising a calculation device that calculates differences between pressure values detected by pressure sensors combined at random from among pressure values detected by the plurality of pressure sensors when the elastic projection elastically deforms due to the external pressure, and calculates a direction in which the external pressure is applied and an intensity of the external pressure based on the differences.

3. The detection device according to claim 1, further comprising:
a reinforcing member that is more resilient than the second substrate and is disposed on a first side of the second substrate opposite of a second side to which the elastic projection is disposed.

4. An electronic apparatus comprising the detection device according to claim 1.

5. A robot comprising the detection device according to claim 1.

6. A detection device comprising:
a first substrate on which is arranged a plurality of pressure sensors; and
a second substrate having:
an elastic projection that is elastically deformed in a state in which its tip end portion contacts each of the pressure sensors due to external pressure; and
a support substrate arranged on a side opposite to the first substrate with respect to the elastic projection,
the plurality of pressure sensors being disposed symmetrically, with a contact part serving as the point of symmetry,
the plurality of pressure sensors being disposed in matrix form in two directions that are orthogonal to each other,
the plurality of pressure sensors being disposed in two directions that are orthogonal to each other, with at least four columns and four rows, and
a direction of the external pressure being defined by a component in an x-direction (Fx), a component in a y-direction (Fy), and a component in a z-direction (Fz) based on the following formulas:

$$F_z = \frac{(P_{S2} + P_{S4}) - (P_{S1} + P_{S3})}{P_{S1} + P_{S2} + P_{S3} + P_{S4}} \text{ and}$$

$$F_y = \frac{(P_{S1} + P_{S2}) - (P_{S2} + P_{S4})}{P_{S1} + P_{S2} + P_{S3} + P_{S4}}$$

$F_z = P_{S1} + P_{S2} + P_{S3} + P_{S4}$ where $P_{S1}$ is a pressure value of a first pressure sensor, $P_{S2}$ is a pressure value of a second pressure sensor, $P_{S3}$ is a pressure value of a third pressure sensor, and $P_{S4}$ is a pressure value of a fourth pressure sensor.

7. A detection device comprising:
a first substrate on which is arranged first and second pressure sensors; and
a second substrate having:
an elastic projection that is elastically deformed in a state in which its tip end portion contacts each of the first and second pressure sensors due to external pressure; and
a support substrate arranged on a side opposite to the first substrate with respect to the elastic projection,
the first and second pressure sensors being disposed symmetrically, with a contact part serving as the point of symmetry,
the first and second pressure sensors being disposed in matrix form in two directions that are orthogonal to each other, and
the direction of the external pressure being defined by a component in an x-direction (Fx), a component in a y-direction (Fy), and a component in a z-direction (Fz) based on the following formulas:

$$F_x = \frac{\sum_i P_i r_{xi}}{\sum_i P_i}; F_y = \frac{\sum_i P_i r_{yi}}{\sum_i P_i}; \text{ and } F_z = \frac{\sum_i P_i r_{zi}}{\sum_i P_i}$$

where $P_i$ is the detected value at each sensor, i=total cumber of sensors, $r_{xi}$ is a distance between the contact part and a respective sensor in the x-direction; $r_{yi}$ is a distance between the contact part and a respective sensor in the y-direction; and $r_{zi}$ is a distance between the contact part and a respective sensor in a z-direction.

8. The detection device according to claim 7, when the external pressure is applied to a measurement surface, a direction of the external pressure applied to the measurement surface being detected based on a difference between pressure values detected by the first and second pressure sensors, respectively.

9. The detection device according to claim 7, an intensity of the external pressure applied to a measurement surface of the second substrate being detected based on pressure values detected by the first and second pressure sensors.

10. The detection device according to claim 7, a direction of the external pressure applied to a measurement surface of the second substrate being detected based on a correction coefficient in accordance with positions at which the first and second pressure sensors are disposed.

11. The detection device according to claim 7, further comprising:
a reinforcing member that is more resilient than the support substrate disposed on the second substrate.

12. An electronic apparatus comprising the detection device according to claim 7.

13. A robot comprising the detection device according to claim 7.

* * * * *